US012659789B2

(12) United States Patent
Haider et al.

(10) Patent No.: US 12,659,789 B2
(45) Date of Patent: Jun. 16, 2026

(54) SYSTEMS AND METHOD OF QOS DELIVERY FOR PARAMETERS FOR RESTRICTED TWT

(71) Applicant: Meta Platforms Technologies, LLC, Menlo Park, CA (US)

(72) Inventors: Muhammad Kumail Haider, Sunnyvale, CA (US); Binita Gupta, San Diego, CA (US); Chunyu Hu, Saratoga, CA (US); Chittabrata Ghosh, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 637 days.

(21) Appl. No.: 17/982,014

(22) Filed: Nov. 7, 2022

(65) Prior Publication Data

US 2023/0180052 A1    Jun. 8, 2023

Related U.S. Application Data

(60) Provisional application No. 63/286,732, filed on Dec. 7, 2021.

(51) Int. Cl.
H04W 28/02        (2009.01)
H04W 84/12        (2009.01)
(52) U.S. Cl.
CPC ........ H04W 28/0268 (2013.01); H04W 84/12 (2013.01)

(58) Field of Classification Search
CPC ... H04W 28/0268; H04W 84/12; Y02D 30/70
See application file for complete search history.

(56) References Cited

U.S. PATENT DOCUMENTS

| | | | | |
|---|---|---|---|---|
| 2022/0386372 A1* | 12/2022 | Xin | ................... | H04W 52/0216 |
| 2023/0021113 A1* | 1/2023 | Shafin | ............... | H04W 52/0216 |
| 2023/0058871 A1* | 2/2023 | Xin | ........................ | H04W 72/56 |
| 2024/0032089 A1* | 1/2024 | Chitrakar | .............. | H04W 48/02 |
| 2024/0179744 A1* | 5/2024 | Baek | ................. | H04W 74/0808 |

OTHER PUBLICATIONS

Gupta B., et al., "Delivering QoS Characteristics Element with Restricted TWT Setup," Nov. 27, 2021, 4 pages, Retrieved from the Internet: URL: https://mentor.ieee.org/802.11/dcn/22/11-22-0034-02-00be-cr-qos-characteristicswith-rtwt-setup.docx, [retrieved on May 10, 2022].
Ho D., et al., "Resolution for CIDs Related to TSPEC (CC36)," Sep. 2021, 9 pages, Retrieved from the Internet: URL: https://mentor.ieee.org/802.11%20/dcn/21/11-21-1407-00-00becc36-cr-for-tspec-element.docx.

(Continued)

*Primary Examiner* — Donald L Mills
(74) *Attorney, Agent, or Firm* — Foley & Lardner LLP

(57) ABSTRACT
A device may one or more processors. The one or more processors may be configured to determine a first set of quality of service (QoS) parameters associated with a first traffic identifier (TID) relating to a restricted target wake time (R-TWT) schedule in a wireless local area network (WLAN). The one or more processors may be configured to wirelessly transmit, via a transceiver, a first frame including the first set of QoS parameters.

18 Claims, 10 Drawing Sheets

| Bits: | 2 | 4 | 3 | 16 | 4 | 3 |
|---|---|---|---|---|---|---|
| | Direction 561 | TID 562 | User Priority 563 | Presence Bitmap or Additional Parameters 564 | Link ID 565 | Reserved 566 |

| Octets: | 1 | 1 | 1 | 4 | 4 | 4 | 3 | 3 |
|---|---|---|---|---|---|---|---|---|
| | Element ID 511 | Length 512 | Element ID Extension 513 | Control Info 514 | Minimum Service Interval 515 | Maximum Service Interval 516 | Minimum Data Rate 517 | Delay Bound 518 |

| Octets: | 0 or 2 | 0 or 4 | 0 or 3 | 0 or 4 | 0 or 2 | 0 or 1 | 0 or 1 | 0 or 1 |
|---|---|---|---|---|---|---|---|---|
| | Maximum MSDU Size 519 | Service Start Time 520 | Mean Data Rate 521 | Burst Size 522 | MSDU Lifetime 523 | MSDU Delivery Ratio 524 | MSDU Count Exponent 525 | Medium Time 526 |

Quality of Service (QoS) IE 500

(56)           References Cited

OTHER PUBLICATIONS

Hu C., et al., "Restricted TWT Spec Text Restricted TWT Additional Rules," Oct. 11, 2021, 6 pages, Retrieved from the Internet: URL:https://mentor.ieee.org/802.11/dcn/21/11-21-1802-01-00be-cc36crs-restricted-twt-additional-rules.docx, [retrieved on Dec. 3, 2021].

International Search Report and Written Opinion for International Application No. PCT/US2022/052060 mailed Mar. 31, 2023, 11 pages.

* cited by examiner

1000

Determining, by a device , a first set of quality of service (QoS) parameters associated with a first traffic identifier (TID) relating to a restricted target wake time (R-TWT) schedule 1002

Wirelessly transmitting, via a transceiver, a first frame including the first set of QoS parameters 1004

SYSTEMS AND METHOD OF QOS DELIVERY FOR PARAMETERS FOR RESTRICTED TWT

CROSS-REFERENCE TO RELATED APPLICATION

This application claims priority to U.S. Provisional Patent Application No. 63/286,732 filed on Dec. 7, 2021, which is incorporated by reference herein in its entirety for all purposes.

FIELD OF DISCLOSURE

The present disclosure is generally related to communications, including but not limited systems and methods for delivering quality of service parameters for restricted target wake time operations for wireless communication.

BACKGROUND

Artificial reality, such as a virtual reality (VR), an augmented reality (AR), or a mixed reality (MR), provides immersive experience to a user. In one example, a user wearing a head wearable display (HWD) can turn the user's head to one side, and an image of a virtual object corresponding to a location and/or an orientation of the HWD and a gaze direction of the user can be displayed on the HWD to allow the user to feel as if the user is moving within a space of an artificial reality (e.g., a VR space, an AR space, or a MR space). An image of a virtual object may be generated by a computing device communicatively coupled to the HWD. In some embodiments, the computing device may have access to a network.

SUMMARY

Various embodiments disclosed herein are related to a device including one or more processors. In some embodiments, the one or more processors may be configured to determine a first set of quality of service (QoS) parameters associated with a first traffic identifier (TID) relating to a restricted target wake time (R-TWT) schedule in a wireless local area network (WLAN). The one or more processors may be configured to wirelessly transmit, via a transceiver, a first frame including the first set of QoS parameters.

In some embodiments, the one or more processors may be configured to transmit or receive, via the transceiver, one or more frames associated with the first TID using the first set of QoS parameters during a first service period (SP) of the R-TWT schedule. The one or more processors may be configured to transmit or receive, via the transceiver, one or more frames associated with the first TID using the first set of QoS parameters during a second SP of the R-TWT schedule that is different from the first SP.

In some embodiments, the first frame may be a R-TWT setup frame including one or more information elements (IEs). The one or more IEs of the R-TWT setup frame may include the first set of QoS parameters and the first TID. The one or more information elements may include one or more traffic specification (TSPEC) elements. The one or more IEs of the R-TWT setup frame may further include a second TID and a second set of QoS parameters associated with the second TID. The one or more processors may be configured to transmit or receive one or more frames associated with the second TID using the second set of QoS parameters during one or more service periods (SPs) of the R-TWT schedule.

In some embodiments, the first set of QoS parameters may be the same as the second set of QoS parameters.

In some embodiments, the one or more processors may be configured to determine, after transmitting the first frame, a third set of QoS parameters associated with the first TID relating to the R-TWT schedule. The one or more processors may be configured to wirelessly transmit, via the transceiver, another frame including the third set of QoS parameters. After transmitting the second frame, the one or more processors may be configured to transmit or receive, via the transceiver, one or more frames associated with the first TID using the third set of QoS parameters during one or more SPs of the R-TWT schedule.

In some embodiments, the one or more processors may be configured to determine a change in traffic pattern associated with the first TID, and responsive to determining the traffic pattern change, determine the third set of QoS parameters associated with the first TID relating to the R-TWT schedule.

Various embodiments disclosed herein are related to a method including determining, by one or more processors, a first set of quality of service (QoS) parameters associated with a first traffic identifier (TID) relating to a restricted target wake time (R-TWT) schedule in a wireless local area network (WLAN). The method may include wirelessly transmitting, via a transceiver, a first frame including the first set of QoS parameters.

In some embodiments, the device may transmit or receive, via the transceiver, one or more frames associated with the first TID using the first set of QoS parameters during a first service period (SP) of the R-TWT schedule. The device may transmit or receive, via the transceiver, one or more frames associated with the first TID using the first set of QoS parameters during a second SP of the R-TWT schedule that is different from the first SP.

In some embodiments, the first frame may be a R-TWT setup frame including one or more information elements (IEs). The one or more IEs of the R-TWT setup frame may include the first set of QoS parameters and the first TID. The one or more information elements may include one or more traffic specification (TSPEC) elements. In some embodiments, the one or more IEs of the R-TWT setup frame may further include a second TID and a second set of QoS parameters associated with the second TID. The device may transmit or receive one or more frames associated with the second TID using the second set of QoS parameters during one or more service periods (SPs) of the R-TWT schedule. In some embodiments, the first set of QoS parameters may be the same as the second set of QoS parameters.

In some embodiments, the device may determine, after transmitting the first frame, a third set of QoS parameters associated with the first TID relating to the R-TWT schedule. The device may wirelessly transmit, via the transceiver, another frame including the third set of QoS parameters. After transmitting the second frame, the device may transmit or receive, via the transceiver, one or more frames associated with the first TID using the third set of QoS parameters during one or more SPs of the R-TWT schedule.

In some embodiments, the device may determine a change in traffic traffic associated with the first TID. Responsive to determining the traffic pattern change, the device may determine the third set of QoS parameters associated with the first TID relating to the R-TWT schedule.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
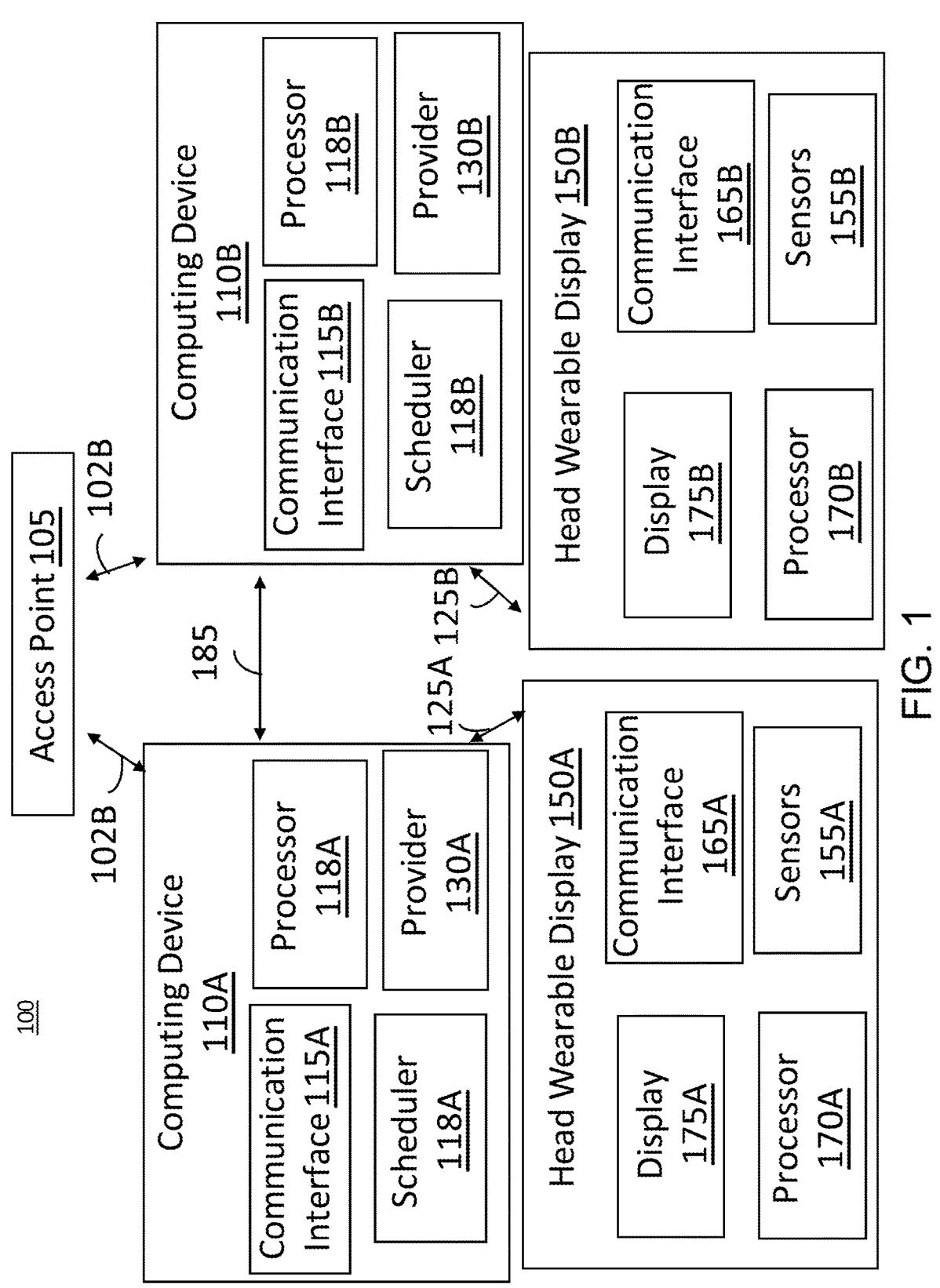
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are systems and methods related to providing QoS parameters for restricted TWT (R-TWT) operations. In some embodiments, a device (e.g., a computing device, a HWD, an access point (AP), a non-AP station (STA)) may include one or more processors. The one or more processors may determine a first set of quality of service (QoS) parameters (e.g., QoS parameters based on Traffic Specification (TSPEC) elements) associated with a first traffic identifier (TID) relating to a restricted target wake time (R-TWT) schedule in a wireless local area network (WLAN). The one or more processors may wirelessly transmit, via a transceiver, a first frame including the first set of QoS parameters.

Streams of traffic may be characterized by different types of traffic. For instance, an application may be characterized by latency sensitive traffic (e.g., video/voice (VI/VO), real time interactive applications, and the like) or regular traffic (e.g., best effort/background applications (BE/BK)). Latency sensitive traffic may be identifiable or characterized, in part, based on its bursty nature (e.g., periodic bursts of traffic), in some embodiments. For instance, video display traffic may be driven by a refresh rate of 60 Hz, 72 Hz, 90 Hz, or 120 Hz. An application and/or device may have combinations of traffic types (e.g., latency sensitive traffic and non-latency sensitive traffic). Further, each stream of traffic for the application and/or device may be more or less spontaneous and/or aperiodic as compared to the other streams of traffic for the application and/or device. Accordingly, traffic may vary according to applications and/or channel rate dynamics.

TWT can be a time agreed/negotiated upon by devices (e.g., access points (APs) and/or stations (STAs)), or specified/configured by one device (e.g., an AP). During the wake time, a first device (e.g., a STA) may be in an awake state (e.g., its wireless communication module/interface is in a fully powered-up ready, or wake state) and is able to transmit and/or receive. When the first device is not awake (e.g., its wireless communication module/interface is in a powered-down, low power, or sleep state), the first device may enter a low power mode or other sleep mode. The first device may exist in the sleep state until a time instance/window as specified by the TWT.

TWT is a mechanism where a set of service periods (SPs) are defined and shared between devices to reduce medium contention and improve the power efficiency of the devices. For example, the first device can wake up periodically (e.g., at a fixed, configured time interval/period/cycle) based on the TWT. The TWT reduces energy consumption of the devices by limiting the awake time and associated power consumption of the devices.

An AP (e.g., AP and/or other device operating as a soft AP/hotspot) may enhance medium access protection and resource reservation by supporting restricted TWT (R-TWT). The R-TWT SPs may be used to deliver latency sensitive traffic and/or any additional frame that supports latency sensitive traffic.

Latency sensitive traffic that is not prioritized (or protected) may degrade a user experience. For example, in an AR context, latency between a movement of a user wearing an AR device and an image corresponding to the user movement and displayed to the user using the AR device may cause judder, resulting in motion sickness.

In one implementation, an image of a virtual object is generated by a remote computing device communicatively coupled to the HWD, and the image is rendered by the HWD to conserve computational resources and/or achieve bandwidth efficiency. In one example, the HWD includes various sensors that detect a location and/or orientation of the HWD and a gaze direction of the user wearing the HWD, and transmits sensor measurements indicating the detected location and gaze direction to a console device (and/or a remote server, e.g., in the cloud) through a wired connection or a wireless connection. The console device can determine a user's view of the space of the artificial reality according to the sensor measurements, and generate an image of the space of the artificial reality corresponding to the user's view. The console device can transmit the generated image to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

Disclosed herein includes systems, devices and methods for configuring a legacy/existing/specific communication system or device to support or conform to R-TWT operations using quality of service parameters. In one aspect, certain devices may communicate according to R-TWT operations to prioritize and/or reserve time periods for latency sensitive traffic. Meanwhile, legacy systems or devices that do not support R-TWT operations may attempt to access the channel during the reserved time periods, and can interfere with the latency sensitive traffic.

In one aspect, one or more access points and station devices, for example conforming to Wi-Fi standard may implement capability fields to protect R-TWT operations (e.g., to protect R-TWT service periods). In one approach, a device (e.g., access point or station device) can transmit (a message with) a R-TWT operation support field that indicates whether the device can support R-TWT operations. The R-TWT operation support field may be set in an extreme high throughput (EHT) capability field. If two devices (e.g., access point and station device) can support R-TWT operations, then the two devices may operate according to R-TWT operations (e.g., according to R-TWT access rules).

In one approach, a device (e.g., access point or station device) that may or may not support R-TWT operation (e.g., corresponding to its R-TWT Operation Support" field) may specify (e.g., by transmitting a frame with) a restricted-TWT start time protection (RSTP) support capability field that indicates whether the device can support start time (window) protection (e.g., support access rules for protection of a service period (SP) reserved for or restricted to latency-sensitive traffic). The RSTP support capability field may be set in an EHT capability field. If a station device does not support the RSTP capability (e.g., does not send a frame announcing/indicating that its "RSTP Support" field is set to 1), and an access point is communicating with or scheduled to communicate with another device according to a R-TWT operation, then the access point may refuse or reject association with the station device, such that the station device may not interfere with the (latency-sensitive or R-TWT-based) communication between the access point and the another device. If the station device supports the RSTP capability (station device's RSTP Support field is set to 1), then the access point may allow communication with the station device, but may cause or instruct (or be in agreement with) the station device to end its communication before the start of the service period allocated or reserved for the another device, according to access rules for R-TWT operation. Accordingly, service/time periods reserved or allocated according to R-TWT operations can be protected from interference by legacy or other devices that may not support or operate according to R-TWT operations. Therefore, latency sensitive traffic, for example, for AR/VR content/applications, can be provided with reduced delay/latency through R-TWT operations.

FIG. 1 is a block diagram of an example artificial reality system environment. FIG. 1 provides an example environment in which devices may communicate traffic streams with different latency sensitivities/requirements. In some embodiments, the artificial reality system environment 100 includes an access point (AP) 105, one or more head wearable displays (HWD) 150 (e.g., HWD 150A, 150B) worn by a user, and one or more computing devices 110 (computing devices 110A, 110B) providing content of artificial reality to the HWDs 150.

The access point 105 may be a router or any network device allowing one or more computing devices 110 and/or one or more HWDs 150 to access a network (e.g., the Internet). The access point 105 may be replaced by any communication device (cell site). A HWD may be referred to as, include, or be part of a head mounted display (HMD), head mounted device (HMD), head wearable device (HWD), head worn display (HWD) or head worn device (HWD). In one aspect, the HWD 150 may include various sensors to detect a location, an orientation, and/or a gaze direction of the user wearing the HWD 150, and provide the detected location, orientation and/or gaze direction to the computing device 110 through a wired or wireless connection. The HWD 150 may also identify objects (e.g., body, hand face).

In some embodiments, the computing devices 110A, 110B communicate with the access point 105 through communication links 102A, 102B (e.g., interlinks), respectively. In some embodiments, the computing device 110A may communicate with the HWD 150A through a communication link 125A (e.g., intralink), and the computing device 110B may communicate with the HWD 150B through a wireless link 125B (e.g., intralink).

The computing device 110 may be a computing device or a mobile device that can retrieve content from the access point 105, and can provide image data of artificial reality to a corresponding HWD 150. Each HWD 150 may present the image of the artificial reality to a user according to the image data.

The computing device 110 may determine a view within the space of the artificial reality corresponding to the detected location, orientation and/or the gaze direction, and generate an image depicting the determined view detected by the HWD 150$s$. The computing device 110 may also receive one or more user inputs and modify the image according to the user inputs. The computing device 110 may provide the image to the HWD 150 for rendering. The image of the space of the artificial reality corresponding to the user's view can be presented to the user.

In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the computing device 110 may be performed by the HWD 150, and/or some of the functionality of the HWD 150 may be performed by the computing device 110. In some embodiments, the computing device 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155 (e.g., sensors 155A, 155B) including eye trackers and hand trackers for instance, a communication interface 165 (e.g., communication interface 165A, 165B), an electronic display 175, and a processor 170 (e.g., processor 170A, 170B). These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, hand trackers, eye trackers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the sensors 155 may also include eye trackers with electronic components or a combination of electronic components and software components that determine a gaze direction of the user of the HWD 150. In other embodiments, the eye trackers may be a component separate from sensors 155. In some embodiments, the HWD 150, the computing device 110 or a combination may incorporate the gaze direction of the user of the HWD 150 to generate image data for artificial reality. In some embodiments, the eye trackers (as part of the sensors 155, for instance) include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers may determine that the gaze direction of the user is 20 degrees from the reference direction. In some embodiments, a user of the HWD 150 can configure the HWD 150 (e.g., via user settings) to enable or disable the eye trackers as part of the sensors 155. In some embodiments, a user of the HWD 150 is prompted to enable or disable the eye trackers as part of the sensor 155 configuration.

In some embodiments, the sensors 155 include the hand tracker, which includes an electronic component or a combination of an electronic component and a software component that tracks a hand of the user. In other embodiments, the hand tracker may be a component separate from sensors 155. In some embodiments, the hand tracker includes or is coupled to an imaging sensor (e.g., camera) and an image processor that can detect a shape, a location and/or an orientation of the hand. The hand tracker may generate hand tracking measurements indicating the detected shape, location and/or orientation of the hand.

In some embodiments, the communication interfaces 165 (e.g., communication interface 165A, 165B) of the corresponding HWDs 150 (e.g., HWD 150A, 150B) and/or communication interfaces 115 (e.g., communication interface 115A, 115B) of the corresponding computing devices (e.g., computing device 110A, 110B) include an electronic component or a combination of an electronic component and a software component that is used for communication.

The communication interface 165 may communicate with a communication interface 115 of the computing device 110 through an intralink communication link 125 (e.g., communication link 125A, 125B). The communication interface 165 may transmit to the computing device 110 sensor measurements indicating the determined location of the HWD 150, orientation of the HWD 150, the determined gaze direction of the user, and/or hand tracking measurements. For example, the computing device 110 may receive sensor measurements indicating location and the gaze direction of the user of the HWD 150 and/or hand tracking measurements and provide the image data to the HWD 150 for presentation of the artificial reality, for example, through the wireless link 125 (e.g., intralink). For example, the communication interface 115 may transmit to the HWD 150 data describing an image to be rendered. The communication interface 165 may receive from the computing device 110 sensor measurements indicating or corresponding to an image to be rendered. In some embodiments, the HWD 150 may communicate with the access point 105.

Similarly, the communication interface 115 (e.g., communication interface 115A, 115B) of the computing devices 110 may communicate with the access point 105 through a communication link 102 (e.g., communication link 102A, 102B). In certain embodiments, the computing device 110 may be considered a soft access point (e.g., a hotspot device). Through the communication link 102 (e.g., interlink), the communication interface 115 may transmit and receive from the access point 105 AR/VR content. The communication interface 115 of the computing device 110 may also communicate with communication interface 115 of a different computing device 110 through communication link 185. As described herein, the communication interface 115 may be a counterpart component to the communication interface 165 to communicate with a communication interface 115 of the computing device 110 through a communication link (e.g., USB cable, a wireless link).

The communication interfaces 115 and 165 may receive and/or transmit information indicating a communication link (e.g., channel, timing) between the devices (e.g., between the computing devices 110A and 110B across communication link 185, between the HWD 150A and computing device 110A across communication link 125). According to the information indicating the communication link, the devices may coordinate or schedule operations to avoid interference or collisions.

The communication link may be a wireless link, a wired link, or both. In some embodiments, the communication interface 165/115 includes or is embodied as a transceiver for transmitting and receiving data through a wireless link. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the computing device 110 and the head wearable display 150 are implemented on a single system, the communication interface 165 may communicate with the computing device 110 through a bus connection or a conductive trace.

Using the communication interface, the computing device 110 (or HWD 150, or AP 105) may coordinate operations on links 102, 185 or 125 to reduce collisions or interferences by scheduling communication. For example, the computing device 110 may coordinate communication between the computing device 110 and the HWD 150 using communication link 125. Data (e.g., a traffic stream) may flow in a direction on link 125. For example, the computing device 110 may communicate using a downlink (DL) communication to the HWD 150 and the HWD 150 may communicate using an uplink (UL) communication to the computing device 110. In some implementations, the computing device 110 may transmit a beacon frame periodically to announce/ advertise a presence of a wireless link between the computing device 110 and the HWD 150 (or between HWDs 150A and 150B). In an implementation, the HWD 150 may monitor for or receive the beacon frame from the computing device 110, and can schedule communication with the HWD 150 (e.g., using the information in the beacon frame, such as an offset value) to avoid collision or interference with communication between the computing device 110 and/or HWD 150 and other devices.

In some embodiments, the processor 170 may include an image renderer, for instance, which includes an electronic component or a combination of an electronic component and a software component that generates one or more images for display, for example, according to a change in view of the space of the artificial reality. In some embodiments, the image renderer is implemented as processor 170 (or a graphical processing unit (GPU), one or more central processing unit (CPUs), or a combination of them) that executes instructions to perform various functions described herein. In other embodiments, the image renderer may be a component separate from processor 170. The image renderer may receive, through the communication interface 165, data describing an image to be rendered, and render the image through the electronic display 175. In some embodiments, the data from the computing device 110 may be encoded, and the image renderer may decode the data to generate and render the image. In one aspect, the image renderer receives the encoded image from the computing device 110, and decodes the encoded image, such that a communication bandwidth between the computing device 110 and the HWD 150 can be reduced.

In some embodiments, the image renderer receives, from the computing device, 110 additional data including object information indicating virtual objects in the artificial reality space and depth information indicating depth (or distances from the HWD 150) of the virtual objects. Accordingly, the image renderer may receive from the computing device 110 object information and/or depth information. The image renderer may also receive updated sensor measurements from the sensors 155. The process of detecting, by the HWD 150, the location and the orientation of the HWD 150 and/or the gaze direction of the user wearing the HWD 150, and generating and transmitting, by the computing device 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer may generate a small portion (e.g., 10%) of an image corresponding to an updated view within the artificial reality according to the updated sensor measurements, and append the portion to the image in the image data from the computing device 110 through reprojection. The image renderer may perform shading and/or blending on the appended edges. Hence, without recreating the image of the artificial reality according to the updated sensor measurements, the image renderer can generate the image of the artificial reality.

In other implementations, the image renderer generates one or more images through a shading process and a reprojection process when an image from the computing device 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the processor 170 (e.g., image renderer).

In some embodiments, the HWD 150 may include a lens to allow the user to see the display 175 in a close proximity. The lens may be a mechanical component that alters received light from the electronic display 175. The lens may magnify the light from the electronic display 175, and correct for optical error associated with the light. The lens may be a Fresnel lens, a convex lens, a concave lens, a filter, or any suitable optical component that alters the light from the electronic display 175. Through the lens, light from the electronic display 175 can reach the pupils, such that the user can see the image displayed by the electronic display 175, despite the close proximity of the electronic display 175 to the eyes.

In some embodiments, the processor 170 performs compensation to compensate for any distortions or aberrations. In some embodiments, a compensator may be a device separate from the processor 170. The compensator includes an electronic component or a combination of an electronic component and a software component that performs compensation. In one aspect, the lens introduces optical aberrations such as a chromatic aberration, a pin-cushion distortion, barrel distortion, etc. The compensator may determine a compensation (e.g., predistortion) to apply to the image to be rendered from the image renderer to compensate for the distortions caused by the lens, and apply the determined compensation to the image from the image renderer. The compensator may provide the predistorted image to the electronic display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a communication interface 115, a processor 118, and a content provider 130 (e.g., content provider 130A, 130B). These components may operate together to determine a view (e.g., a field of view (FOV) of the user) of the artificial reality corresponding to the location of the HWD 150 and/or the gaze direction of the user of the HWD 150, and can generate an image of the artificial reality corresponding to the determined view.

The processors 118, 170 includes or is embodied as one or more central processing units, graphics processing units, image processors, or any processors for generating images of the artificial reality. In some embodiments, the processors 118, 170 may configure or cause the communication interfaces 115, 165 to toggle, transition, cycle or switch between a sleep mode and a wake up mode. In the wake up mode, the processor 118 may enable the communication interface 115 and the processor 170 may enable the communication interface 165, such that the communication interfaces 115, 165 may exchange data. In the sleep mode, the processor 118 may disable the wireless interface 115 and the processor 170 may disable (e.g., may implement low power or reduced operation in) the communication interface 165, such that the communication interfaces 115, 165 may not consume power, or may reduce power consumption.

The processors 118, 170 may schedule the communication interfaces 115, 165 to switch between the sleep mode and the wake up mode periodically every frame time (e.g., 11 ms or 16 ms). For example, the communication interfaces 115, 165 may operate in the wake up mode for 2 ms of the frame time, and the communication interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced or minimized.

In some embodiments, the processors 118, 170 may configure or cause the communication interfaces 115, 165 to resume communication based on stored information indicating communication between the computing device 110 and the HWD 150. In the wake up mode, the processors 118, 170 may generate and store information (e.g., channel, timing) of the communication between the computing device 110 and the HWD 150. The processors 118, 170 may schedule the communication interfaces 115, 165 to enter a subsequent wake up mode according to timing of the previous communication indicated by the stored information. For example, the communication interfaces 115, 165 may predict/determine when to enter the subsequent wake up mode, according to timing of the previous wake up mode, and can schedule to enter the subsequent wake up mode at the predicted time. After generating and storing the information and scheduling the subsequent wake up mode, the processors 118, 170 may configure or cause the wireless interfaces 115, 165 to enter the sleep mode. When entering the wake up mode, the processors 118, 170 may cause or configure the communication interfaces 115, 165 to resume communication via the channel or frequency band of the previous communication indicated by the stored information. Accordingly, the communication interfaces 115, in 165 entering the wake up mode from the sleep mode may resume communication, while bypassing a scan procedure to search for available channels and/or performing handshake or authentication. Bypassing the scan procedure allows extension of a duration of the communication interfaces 115, 165 operating in the sleep mode, such that the computing device 110 and the HWD 150 can reduce power consumption.

In some embodiments, the computing devices 110A, 110B may coordinate operations to reduce collisions or interferences. In one approach, the computing device 110A may transmit a beacon frame periodically to announce/advertise a presence of a wireless link 125A between the computing device 110A and the HWD 150A and can coordinate the communication between the computing device 110A and the HWD 150A. The computing device 110B may monitor for or receive the beacon frame from the computing device 110A, and can schedule communication with the HWD 150B (e.g., using information in the beacon frame, such as an offset value) to avoid collision or interference with communication between the computing device 110A and the HWD 150A. For example, the computing device 110B may schedule the computing device 110B and the HWD 150B to enter a wake up mode, when the computing device 110A and the HWD 150A operate in the sleep mode. For example, the computing device 110B may schedule the computing device 110B and the HWD 150B to enter a sleep up mode, when the computing device 110A and the HWD 150A operate in the wake up mode. Accordingly, multiple computing devices 110 and HWDs 150 in proximity (e.g., within 20 ft) may coexist and operate with reduced interference.

The content provider 130 can include or correspond to a component that generates content to be rendered according to the location and/or orientation of the HWD 150, the gaze direction of the user and/or hand tracking measurements. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 130 may generate image data describing an image of the determined view of the artificial reality space, and transmit the image data to the HWD 150 through the communication interface 115. The content provider may also generate a hand model (or other virtual object) corresponding to a hand of the user according to the hand tracking measurement, and generate hand model data indicating a shape, a location, and an orientation of the hand model in the artificial reality space. The content provider 130 may encode the image data describing the image, and can transmit the encoded data to the HWD 150. In some embodiments, the content provider generates and provides the image data to the HWD 150 periodically (e.g., every 11 ms or 16 ms).

In some embodiments, the content provider 130 generates metadata including motion vector information, depth information, edge information, object information, etc., associated with the image, and transmits the metadata with the image data to the HWD 150 through the communication interface 115. The content provider 130 may encode and/or encode the data describing the image, and can transmit the encoded and/or encoded data to the HWD 150. In some embodiments, the content provider 130 generates and provides the image to the HWD 150 periodically (e.g., every one second).

In some embodiments, a scheduler 118 (e.g., scheduler 118A of the computing device 118A and/or scheduler 118B of the computing device 110B) may request R-TWT to transmit latency sensitive traffic using P2P communication. The AP 105 and scheduler 118 of the computing devices 110 may negotiate (e.g., perform a handshake process) and may establish a membership of a restricted TWT schedule. In some embodiments, when the AP 105 and the scheduler 118 are negotiating, the AP 105 may be considered a restricted TWT scheduling AP and the computing devices 110 may be considered a restricted TWT scheduled STA.

In some embodiments, the HWD 150 may request to send P2P traffic to the computing device 110. Accordingly, the HWD 150 may be considered the TWT requesting STA (e.g., the TWT STA that requests the TWT agreement), and the computing device 110 may be considered TWT responding STA (e.g., the TWT STA that respond to the TWT request). The communication link 125 between the computing devices 110 and the HWDs 150 may be a P2P link (e.g., a link used for transmission between two non-AP devices). The communication link 102 between the computing devices 110 and the AP 105 may be any channel or other type of link. In some configurations, the HWD 150 may move/become out of range from the access point 105. In other embodiments, the computing device 110 may request to send P2P traffic to the HWD 150 such that the computing device 110 is considered the TWT requesting STA and the HWD 150 is the TWT responding STA.

The schedulers 118 of the computing devices 110 may schedule communication between the computing device(s) 110 and the HWD(s) 150 with the AP 105 such that the communication between the computing device(s) 110 and HWD(s) 150 is protected. The computing device(s) 110 may initiate such protected P2P communication with the HWD(s) 150 by indicating, to the AP 105, that the computing device(s) 110 wish to schedule P2P communication in R-TWT service periods (SPs). The scheduler 118 of the computing device(s) may schedule (or negotiate) the requested R-TWT SP(s). The scheduler 118 of the computing device(s) may also indicate if the SP(s) are requested only for P2P communication (as compared to mixed P2P communication and non-P2P communication).

Figure 2:
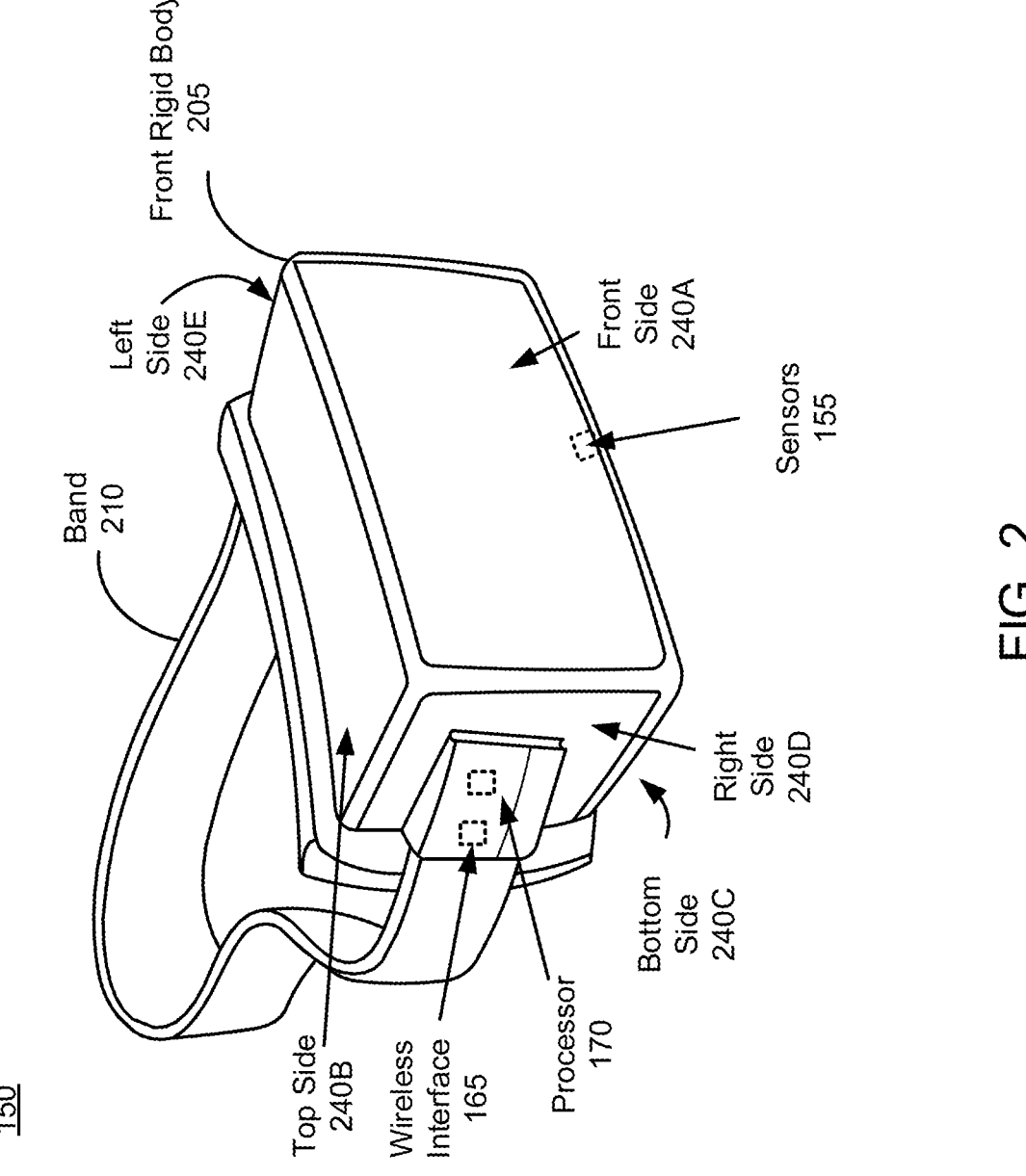
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens (not shown in FIG. 2), the sensors 155, the eye trackers the communication interface 165, and the processor 170. In the embodiment shown by FIG. 2, the sensors 155 are located within the front rigid body 205, and may not visible to the user. In other embodiments, the HWD 150 has a different configuration than shown in FIG. 2. For example, the processor 170, the eye trackers, and/or the sensors 155 may be in different locations than shown in FIG. 2.

Figure 3:
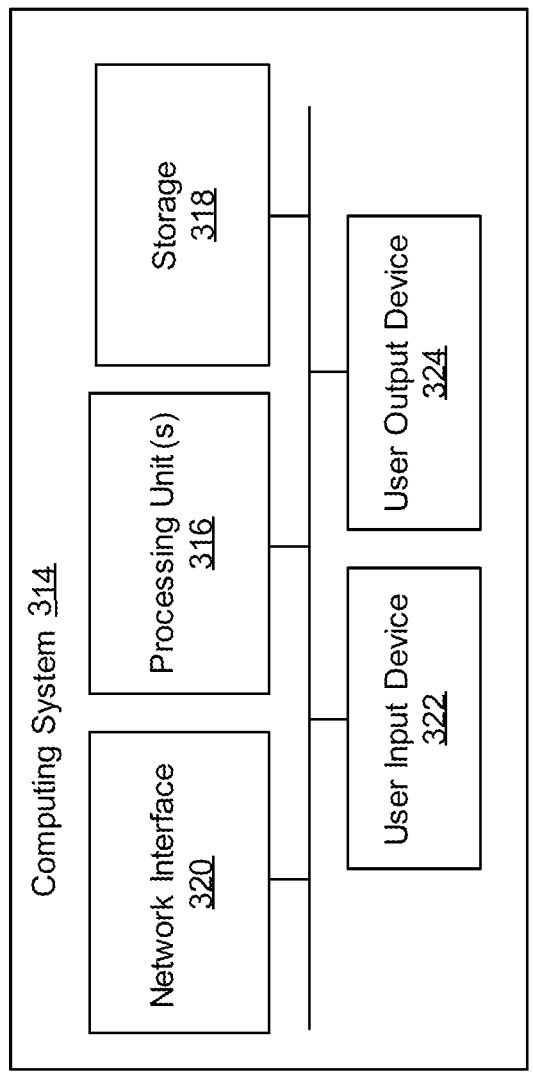
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the computing device 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 4:
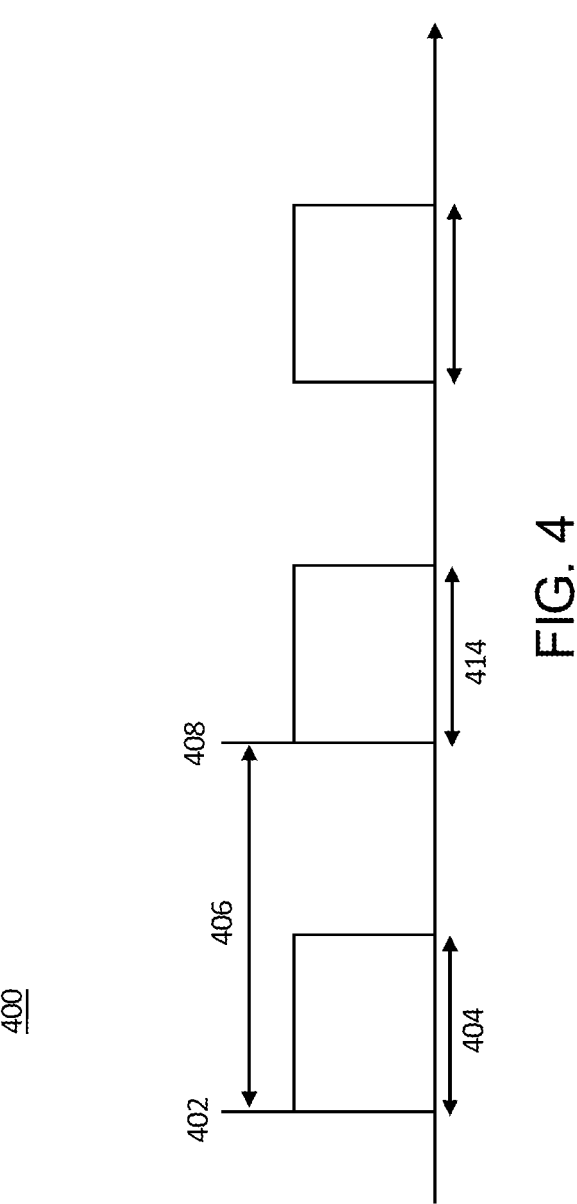
FIG. 4 is a timing diagram showing a wake-up/sleep schedule of a computing device utilizing TWT, according to an example implementation of the present disclosure.

FIGS. 1-2 illustrate devices that communicate traffic streams some of which may be latency sensitive (e.g., those carrying periodic AR/VR information/content). As described herein, the periodic operation of TWT benefits communication of periodic traffic (e.g., latency sensitive traffic) by predictably communicating the periodic traffic. FIG. 4 is a timing diagram 400 showing a wake-up/sleep schedule of a computing device utilizing TWT, according to an example implementation of the present disclosure. The TWT start time is indicated by the computing device 110 (e.g., a portion of its relevant modules/circuitry) waking up at 402. The computing device 110 may wake up for a duration 404 defined by a (first) SP. After the SP duration 404, the computing device 110 may enter a sleep state until the next TWT start time at 408, at which the computing device 110 may wake up for a duration 414 defined by a (second) SP. The interval of time between TWT start time 402 and TWT start time 408 may be considered the SP interval 406.

A TWT schedule may be communicated and/or negotiated using broadcast TWT (bTWT) and/or individual TWT (iTWT) signaling. In some embodiments, to signal iTWT, TWT schedule information may be communicated to particular (individual) devices using a mode such as a Network Allocation Vector (NAV) to protect the medium access of TWT SPs. In contrast, to signal bTWT, in some embodiments, a device (such as AP 105) may schedule TWT SPs with other devices (e.g., computing devices 110 and/or HWDs 150) and may share schedule information in beacon frames and/or probe response frames. Sharing schedule information using bTWT may reduce overhead (e.g., negotiation overhead) as compared to the overhead used when sharing information using iTWT.

The TWT mechanism may also be used in peer-to-peer (P2P) communication. For example, TWT may be defined for tunneled direct link setup (TDLS) pairs (e.g., non-AP STAs), soft APs (such as computing devices 110) and STAs (such as HWD 150), and/or peer-to-peer group owners (GO) and group clients (GC). For instance, a TDLS pair of devices (e.g., HWD 150 and computing device 110) can request TWT membership for its latency sensitive traffic over a channel. In another example, a group owner (GO), such as a computing device 110, may request TWT membership for latency sensitive traffic over the P2P link.

When P2P communication is established, various channel access rules may govern the P2P communication. An AP assisted P2P trigger frame sequence may reduce the contention/collision associated with TWT (or R-TWT) in P2P communication. Accordingly, a P2P model where a P2P STA (e.g., a HWD 150) is not associated with an infra-basic service set (BSS) AP, may improve P2P communication. Without AP's assistance or coordination, a transmission over the P2P link may collide with another transmission in the BSS. In some embodiments, a reverse direction protocol (RDP) may be enabled for P2P communication. During RDP, when a transmitting STA has obtained a transmit opportunity (TXOP), the transmitting STA may grant permission for the receiving STA to transmit information back to the transmitting STA during the same TXOP. Accordingly, if a TWT setup allows P2P transmission and indicates RDP, the P2P communication can be performed after a triggered frame sequence (e.g., a reverse direction frame exchange). In other embodiments, other protocols may be enabled for P2P communication. In some embodiments, trigger-enabled TWT can reduce the medium contention and/or collisions between UL and DL transmissions. The trigger-enabled TWT may be indicated using a TWT information element (IE).

Figure 5:
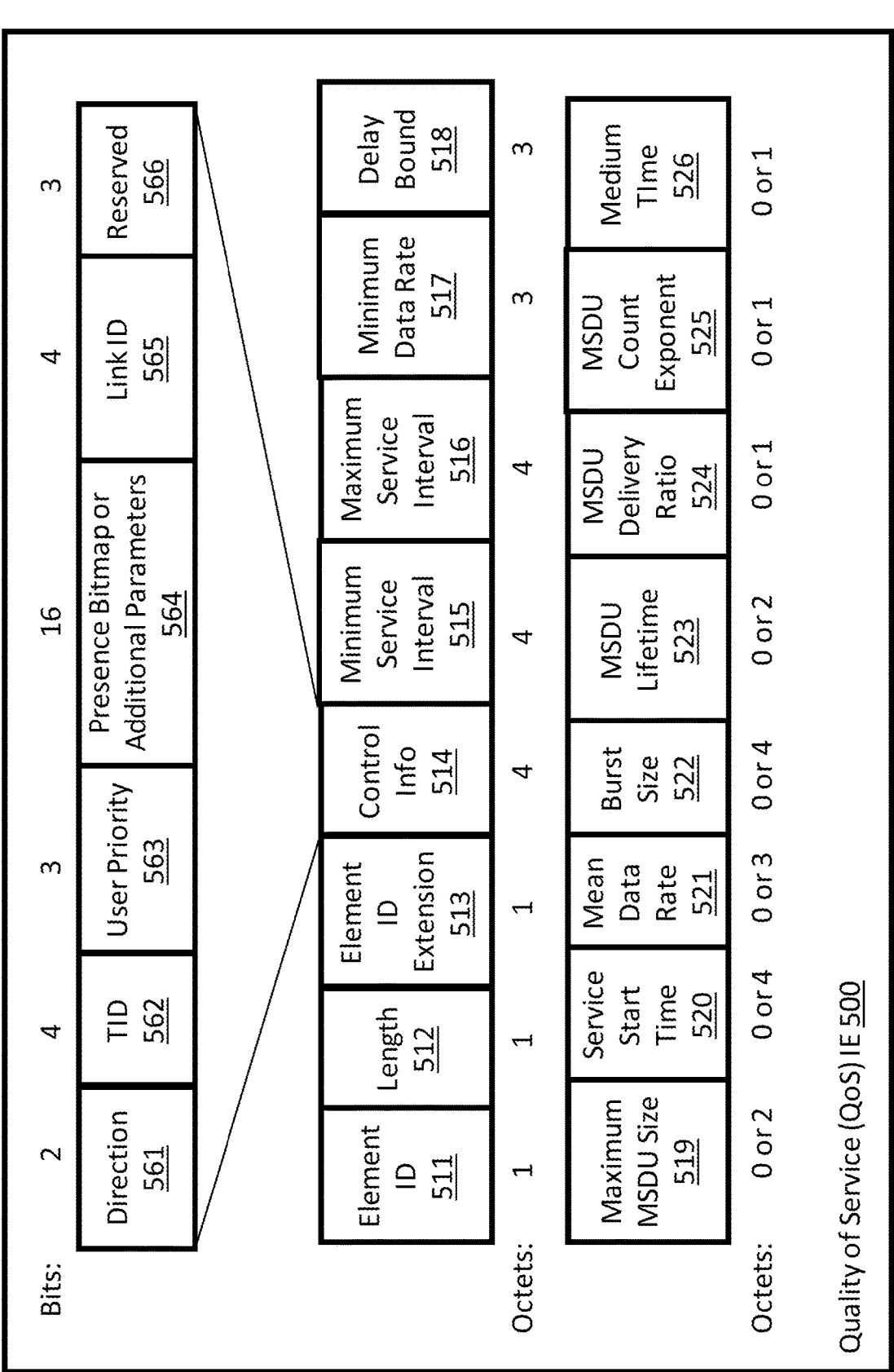
FIG. 5 is an example format of a quality of service (QoS) element field, according to an example implementation of the present disclosure.

In some embodiments, an information element (IE) may deliver quality of service (QoS) characteristics based on Traffic Specification (TSPEC) element with a reduced set of mandatory and optional fields. The TSPEC element may include a legacy configuration/structure of 47 bytes. FIG. 5 is an example format of a QoS element field (or QoS information element (IE)) 500, according to an example implementation of the present disclosure. The QoS IE 500 may include the fields of element ID 511, length 512, element ID extension 513, control information 514, minimum service interval 515, maximum service interval 516, minimum data rate 517, delay bound 518, maximum medium access control (MAC) service data unit (MSDU) size 519, service start time 520, mean data rate 521, burst size 522, MSDU lifetime 523, MSDU delivery ratio 524, MSDU count exponent 525, and/or medium time 526. In some embodiments, the field of control information 514 may include the subfields of direction 561, TID 562, user priority 563, presence bitmap or additional parameters 564, link ID 565, and/or reserved 566.

Stream classification service (SCS) enables the establishment of a classification using layer 2 and/or layer 3 signaling to match incoming individually addressed MSDUs. Once classified, individually addressed MSDUs matching the classification may be assigned to an access category and may be tagged with drop eligibility of the individually addressed MSDUs. For example, the drop eligibility may be indicated by a Drop Eligibility Indicator (DEI) bit that specifies if frames from this traffic stream could be dropped if resources are insufficient. When intra-access category prioritization is enabled (e.g., using the field of intra-access category priority element), SCS allows MSDUs matching the classification to be assigned to the primary or alternate Enhanced Distribution Channel Access (EDCA) transmit queues so that finer grained prioritization can be applied.

Figure 6:
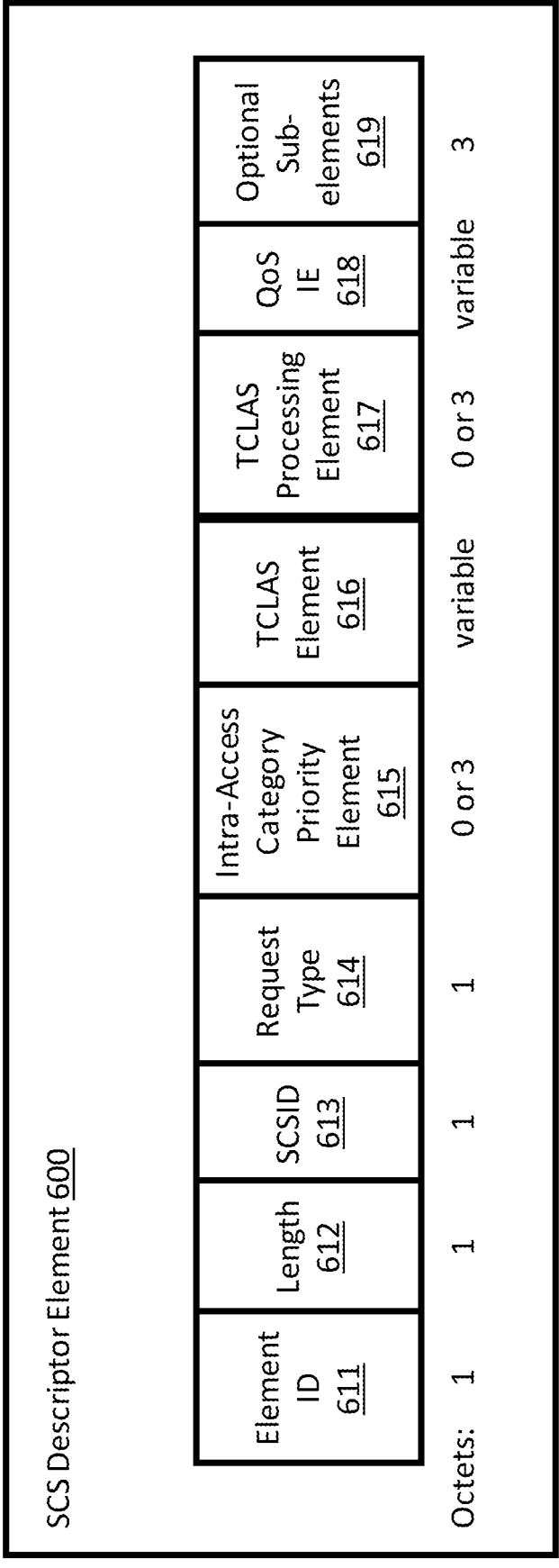
FIG. 6 is an example format of a stream classification service (SCS) descriptor element field, according to an example implementation of the present disclosure.

In some embodiments, a QoS Characteristics element (or QoS IE) may be carried in an SCS request frame and/or SCS response frame to specify QoS parameters for SCS streams. SCS feature may create a traffic classification and/or traffic filter for MSDUs on an access point (AP) and specify the user priority and/or access category (AC) to assign to MSDUs that match the traffic classification. The SCS descriptor element (or SCS descriptor IE) may define information about a stream that is being classified using SCS procedures. FIG. 6 is an example format of an SCS descriptor element field (or SCS descriptor IE) 600, according to an example implementation of the present disclosure. The SCS descriptor IE may include the fields of element ID 611, length 612, SCSID (or SCS ID) 613, request type 614, intra-access category priority element 615, one or more traffic classification (TCLAS) elements 616, TCLAS processing element 617, QoS IE 618, and/or one or more sub-elements 619 (optional). The QoS IE 618 may have a format similar to that of the QoS IE 500.

Referring to FIG. 6, the SCSID field 613 may indicate an identifier (SCSID) identifying an SCS stream. For example, the exchange of SCS request/response frames may establish an SCS stream identified by an SCSID. For request type of "Add" or "Change" (indicated in the field of request type 614), an SCS request/response frame may include one or more TCLAS elements (e.g., TCLAS elements 616) to classify the traffic use in the SCS stream. For request type of "Add" (indicated in the field of request type 614), an SCS request/response frame may add a new SCS stream. For request type of "Change" (indicated in the field of request type 614), an SCS request/response frame may change parameters associated with an existing SCS stream. The field of intra-access category priority element 615 may indicate a drop eligibility by a Drop Eligibility Indicator (DEI) bit that specifies if frames from this traffic stream could be dropped if resources are insufficient. STAs utilizing SCS may set up one or more TCLAS elements (e.g., TCLAS element 616) and/or filters. For example, an AP may map an incoming traffic with a filter and can apply the QOS parameters (e.g., QoS parameters indicated in a QoS IE) to the matching/ relevant traffic. The TCLASS element field 616 may contain zero or more TCLAS elements to specify how incoming MSDUs are classified as part of the SCS stream, as defined in TCLAS element format (now shown in FIG. 6). One or more TCLAS elements 616 may be present when the request type field (e.g., request type 614) is equal to "Add" or "Change," and no TCLAS elements may be present when the request type field (e.g., request type 614) is equal to "Remove."

In some embodiments, the QoS Characteristics element (e.g., QoS IE 500, 618) included in an SCS frame may describe the traffic characteristics for the associated SCS stream (with an SCSID). For example, a QoS IE may provide QoS information (e.g., service interval, data rate, burst size, delay bound, etc.) per SCSID or SCS stream. The QoS IE may contain a set of parameters that define the characteristics and QoS expectations of a traffic flow, in the context of a particular non-AP EHT STA, for use by the EHT AP and the non-AP EHT STA in support of QoS traffic transfer using SCS procedures and R-TWT procedures.

Although QoS parameters specified in a QoS element in an SCS frame can apply to a specific SCS stream (associated with a particular SCSID), the QoS element may not be able to indicate QoS parameters for traffic associated with a TID because SCS IDs are more granular than TIDs. For example, MSDUs for multiple SCS streams (e.g., 256 different SCS streams) can map to the same traffic stream (with the same TID), with potentially different QoS parameters. A TID may be used to identify a traffic stream in an R-TWT schedule. There may be a single link for (or associated with) uplink/ downlink TIDs. It would be a best practice or beneficial to map SCS streams with/having different QoS characteristics to different TIDs.

Setting up traffic filters for MSDUs may be optional in R-TWT. For example, all TIDs for an AR/VR device could be latency sensitive. Because all of the traffic is the same, e.g., latency sensitive, there may not be a need to create a filter for traffic in R-TWT and the QoS parameters for the traffic in R-TWT may be the same or similar. However, in a case in which there are multiple applications running on a device, it may be beneficial to set up a filter in R-TWT and/or specify QoS parameters for traffic associated with different TIDs. In this case, an SCS request/response negotiation which uses SCSID may have limitations in specifying QoS parameters for traffic associated with R-TWT TIDs. A QoS characteristics element specified during an SCS negotiation (e.g., for setting a traffic filter) may be used to specify QoS parameters for a specific SCS stream with a SCSID, while the QoS characteristics element may not be used to specify QoS parameters for all the traffic streams associated with a TID since the QoS parameters can only apply to the specific stream with the SCSID (and SCSID is more granular than TID). Multiple traffic streams which may or may not include SCS streams, may be mapped to one TID. In other words, a TID may be used for identifying multiple traffic streams including different SCS streams so that all EDCA operations with different QoS parameters (associated with different SCS streams) use the TID. It may be beneficial/ required to use the same QoS parameters for traffic associated with same TID. Therefore, R-TWT operations may be improved by defining a mechanism to specify QoS parameters for traffic (e.g., latency sensitive traffic) associated with R-TWT TIDs.

To solve this problem, according to certain aspects, embodiments in the present disclosure relate to techniques for providing a mechanism for a device (e.g., AP or non-AP device (STA)) to provide QoS characteristics for traffic associated with a TID (e.g., low latency traffic) in a manner that is improved from using SCS negotiations.

In one approach, a device (e.g., EHT AP or non-AP EHT STA) may (e.g., optionally) provide QoS parameters for R-TWT TIDs as part of an R-TWT setup, by including one or more QoS characteristics elements (or QoS information elements (IEs)) in an action field of an R-TWT setup frame. The R-TWT setup frame may be an R-TWT setup request frame or an R-TWT setup response frame. In some embodiments, a device may deliver or provide QoS parameters for R-TWT by (e.g., optionally) using a QoS characteristics element in R-TWT negotiations (e.g., exchanging one or more R-TWT setup request frames and/or one or more R-TWT setup response frames), thereby providing QoS parameters for traffic that belongs to or is associated with an R-TWT schedule (e.g., traffic with latency sensitive traffic identifiers (TIDs)).

In one approach, a device (e.g., EHT AP or non-AP EHT STA) may be able to (e.g., optionally) provide QoS parameters for R-TWT TIDs along with an R-TWT setup (e.g., while the R-TWT setup is being negotiated) without performing a prior SCS negotiation. In some embodiments, the device may specify QoS parameters for an R-TWT TID such that the QoS parameters for the R-TWT TID may not rely on R-TWT feature(s) dependent on SCS (e.g., the QoS parameters may not be associated with SCSIDs but are associated with one or more TIDs). QoS parameters for (or associated with) one or more R-TWT TID may enable a faster setup for R-TWT TIDs with QoS parameters (e.g., one step for providing QoS parameters for one or more R-TWT TIDs during an R-TWT setup), compared with QoS parameters for SCSIDs which may be potentially setup by two or multiple steps (e.g., one or more SCS negotiations and then an R-TWT setup).

In some embodiments, an AP (e.g., EHT AP) and a STA (e.g., non-AP EHT STA) can still create and provide QoS characteristics for specific SCS streams, while providing QoS parameters for one or more R-TWT TIDs. One or more SCS streams can be created optionally. If an SCS stream is created before an R-TWT setup, then QoS parameters from (or set up for) the SCS stream may also apply to traffic matching the SCS stream in an R-TWT schedule (e.g., during a service period of the R-TWT schedule). For any other traffic associated with an R-TWT TID, QoS parameters provided in the R-TWT setup for the R-TWT TID may apply.

In some embodiments, an action field format of a TWT setup frame (e.g., TWT setup frame action field format) may be extended to (e.g., optionally) include one or more QoS characteristics elements (or QoS IEs), which can be (e.g., optionally) present in an R-TWT setup frame to provide QoS parameters for the traffic indicated by uplink (UL) TIDs and/or downlink (DL) TIDs negotiated in the R-TWT setup. Accordingly, the QoS characteristics elements may be re-used for an R-TWT schedule (e.g., multiple, periodic SPs of the R-TWT schedule). Instead of containing one or more QoS characteristics elements in SCS request/response frames, a TWT setup frame may contain one or more QoS characteristics elements associated with one or more TIDs. The R-TWT setup frame may be an R-TWT setup request frame or an R-TWT setup response frame. In some embodiments, there may be multiple QoS characteristics elements because as part of an R-TWT setup, there may be negotiation for UL/DL TIDs. In some embodiments, there may be one QoS characteristics element for each TID. In some embodiments, there may be one QoS characteristics element for two or more of the TIDs. In some embodiments, there may be one QoS characteristics element for no TIDs.

In one approach, a device (e.g., EHT AP or non-AP EHT STA) may detect a change in traffic pattern, such as burst, size, delay, etc. In response to detecting a change in traffic pattern, the device may send a TWT setup frame (e.g., TWT setup request frame) again to determine or set up QoS parameters for one or more TID changes for an R-TWT SP. In some embodiments, in response to detecting a change traffic pattern associated with a particular TID, the device may send a TWT setup frame again to change QoS parameters associated with the particular TID. In some embodiments, the device (e.g., non-AP STA) may dynamically send a TWT Setup frame to another device (e.g., AP) based on at least one of detected changes in traffic pattern, channel condition, or a configured schedule/periodic-cycle, to specify changed/revised/updated QoS characteristics elements for the same R-TWT SP and/or renegotiate the R-TWT SP.

In some embodiments, R-TWT features may be able to support a wide range of devices with different application requirements and power/resource constraints. Supporting QoS parameters as part of an R-TWT setup may enable usage of R-TWT by wide range of devices. For example, a device with a small form factor (e.g., handheld small form factor-based devices, or smartphone) may setup R-TWT SPs by including a QoS characteristics element in an R-TWT setup frame (e.g., R-TWT setup request frame or R-TWT setup response frame). The device may (e.g., optionally) perform an SCS negotiation which may be used for setting up a traffic filter and to specify traffic characteristics for specific streams. In this manner, the device may specify QoS parameters for multiple traffic streams at/with different levels of granularity using SCS and R-TWT.

In some embodiments, a device (e.g., low power devices such as internet of things (IOT), wearables, AR/VR devices, etc.) may setup R-TWT SPs with or without QoS characteristics element signaling. In some embodiments, traffic characteristics or QoS characteristics may be implicitly derived from TWT parameters in the TWT element if no QoS element is included. In this manner, QoS characteristics may be determined without performing SCS negotiation so that the device (e.g., non-AP STA) can wake up in "agreed" R-TWT SPs and process traffic according to the determined QoS characteristics. In some embodiments, a minimal set of applications may be dedicated for such (low power) devices asynchronously, and the device can wake up in the agreed R-TWT SPs to reduce power consumption.

In some embodiments, a device (e.g., portable devices such as laptop) may setup restricted TWT SPs and may include a QoS characteristics element in an R-TWT setup frame (e.g., R-TWT setup request frame or R-TWT setup response frame). An SCS negotiation can be optionally used for setting up a traffic filter and specify traffic characteristics for specific streams. In some embodiments, multiple sets of applications may run in background (e.g., email, web browsing, etc.) on the device which can imply multiple streams of traffic, and the device can specify QoS parameters for multiple streams of traffic in different levels of granularity using SCS and R-TWT.

In one approach, a device may include one or more processors. The one or more processors may be configured to determine a first set of QoS parameters associated with a first TID relating to an R-TWT schedule in a WLAN. The one or more processors may be configured to wirelessly transmit, via a transceiver, a first frame including the first set of QoS parameters.

In some embodiments, the one or more processors may be configured to transmit or receive, via the transceiver, one or more frames associated with the first TID using the first set of QoS parameters during a first service period (SP) of the R-TWT schedule. The one or more processors may be configured to transmit or receive, via the transceiver, one or more frames associated with the first TID using the first set of QoS parameters during a second SP of the R-TWT schedule that is different from the first SP.

In some embodiments, the first frame may be a R-TWT setup frame including one or more information elements (IEs). The one or more IEs of the R-TWT setup frame may include the first set of QoS parameters and the first TID. The one or more information elements may include one or more traffic specification (TSPEC) elements. The one or more IEs of the R-TWT setup frame may further include a second TID and a second set of QoS parameters associated with the second TID. The one or more processors may be configured to transmit or receive one or more frames associated with the second TID using the second set of QoS parameters during one or more service periods (SPs) of the R-TWT schedule. In some embodiments, the first set of QoS parameters may be the same as the second set of QoS parameters.

In some embodiments, the one or more processors may be configured to determine, after transmitting the first frame, a third set of QoS parameters associated with the first TID relating to the R-TWT schedule. The one or more processors may be configured to wirelessly transmit, via the transceiver, another frame including the third set of QoS parameters. After transmitting the second frame, the one or more processors may be configured to transmit or receive, via the transceiver, one or more frames associated with the first TID using the third set of QoS parameters during one or more SPs of the R-TWT schedule. The one or more processors may be configured to determine a change in traffic pattern associated with the first TID, and responsive to determining the traffic pattern change, determine the third set of QoS parameters associated with the first TID relating to the R-TWT schedule.

Embodiments in the present disclosure have at least the following advantages and benefits.

First, embodiments in the present disclosure can provide useful techniques for providing a mechanism for a device (e.g., EHT AP or non-AP EHT STA) to provide/determine/specify QoS characteristics for traffic associated with a particular TID (e.g., low latency traffic) using R-TWT setup frames, thereby improving QoS processing from using SCS negotiations in many aspects. For example, QoS parameters for R-TWT TID may enable faster setup for R-TWT TIDs with QoS parameters (e.g., one step for providing QoS parameters for one or more R-TWT TIDs during an R-TWT setup), compared with QoS parameters for SCSIDs which may be potentially setup by two or multiple steps (e.g., one or more SCS negotiations and then an R-TWT setup). The device may specify QoS parameters for traffic with a larger level of granularity (e.g., TID stream level) than SCS streams.

Second, embodiments in the present disclosure can provide useful techniques for a device (e.g., a non-AP EHT STA) to optionally provide QoS parameters for R-TWT TIDs as part of an R-TWT setup, by including one or more QoS characteristics elements in an R-TWT setup frame action field (e.g., R-TWT setup request frame or R-TWT setup response frame). The device also may optionally perform an SCS negotiation which may be used for setting up a traffic filter and to specify traffic characteristics for specific streams. In this manner, the device may specify QoS parameters for multiple traffic streams in different levels of granularity using SCS and R-TWT.

Figure 7:
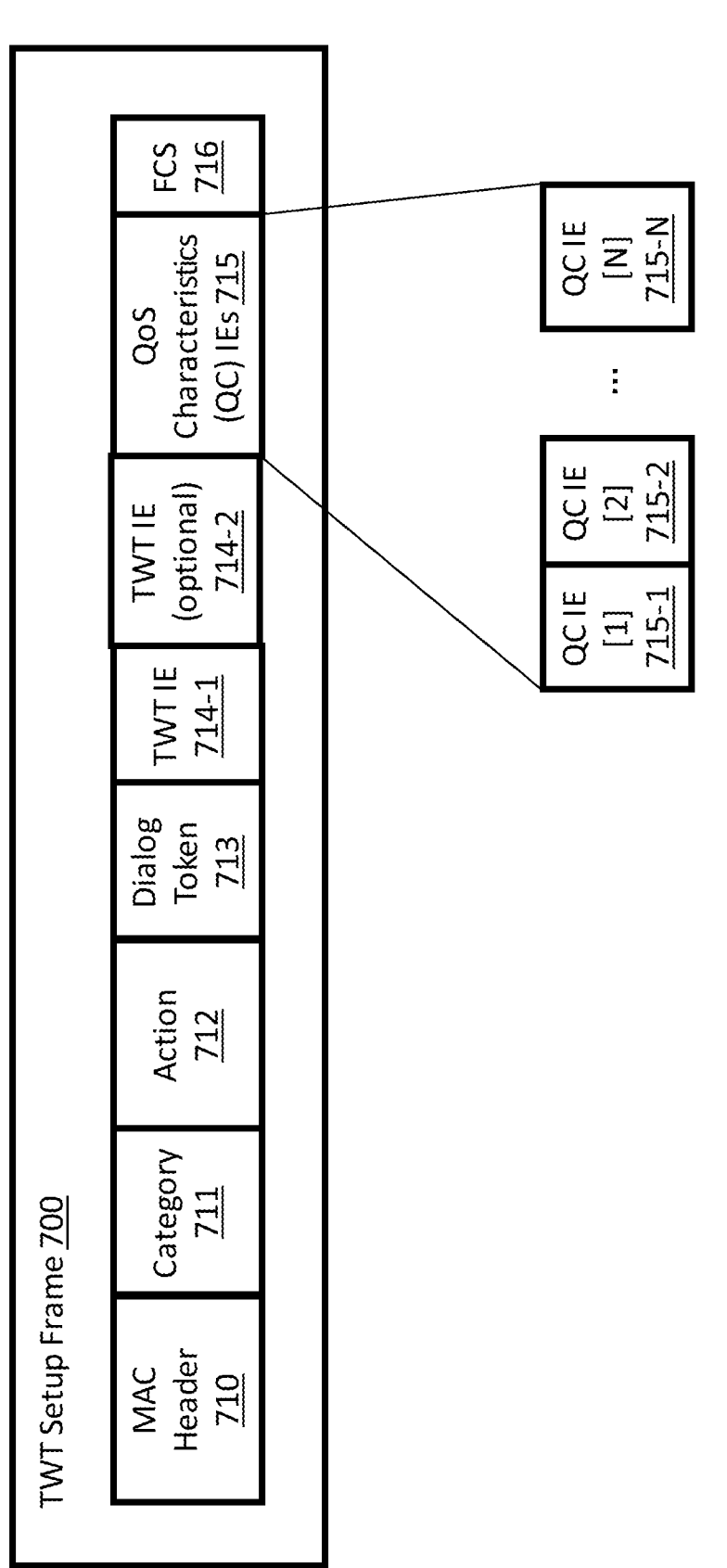
FIG. 7 is an example action field format of a TWT setup frame, according to an example implementation of the present disclosure.

FIG. 7 shows an action field format of a TWT setup frame 700 including the fields of MAC header 710, category 711, action 712, dialog token 713, TWT information element (IE) 714-1, TWT IE 714-2 (optional), one or more QoS IEs 715, and/or frame check sequence (FCS) 716. In some embodiments, the action field 712 may indicate unprotected S1G action. In some embodiments, the QoS IEs 715 may include a QoS IE [1] 715-1, a QoS IE [2] 715-2, . . . , a QoS IE [N] 715-N (N is an integer greater than or equal to 1). Each of QoS IEs 715-1, . . . , 715-N may have a format similar to that of the QoS IE 500. In some embodiments, each of the TWT IE 714-1 and the TWT IE 714-2 (if available) may have a format similar to that of a TWT IE 800 (see FIG. 8). As shown in FIG. 7, a TWT setup frame may usually carry one TWT IE (e.g., TWT IE 714-1), and at most two TWT elements (in a special case; e.g., TWT IEs 714-1, 714-2). A single TWT element may indicate multiple TIDs for an R-TWT schedule, and the QoS IEs corresponding to the multiple TIDs may be included in the TWT setup frame.

Figure 8:
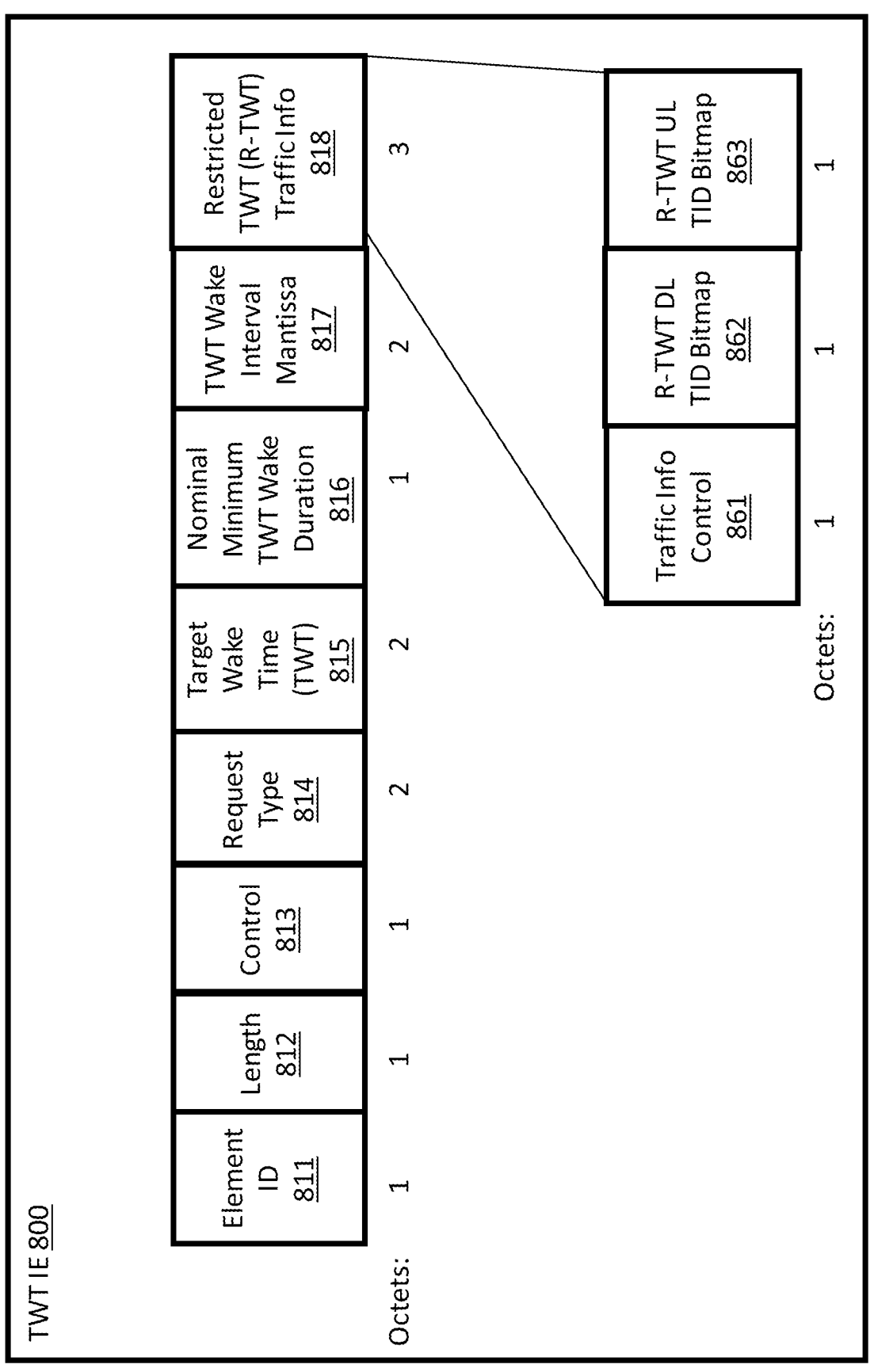
FIG. 8 is an example format of a TWT element field, according to an example implementation of the present disclosure.

FIG. 8 shows an example format of a TWT element field (or TWT IE) 800, according to an example implementation of the present disclosure. The TWT IE 800 may include the fields of element ID 811, length 812, control 813, request type 814, target wake time 815, nominal minimum TWT wake duration 816, TWT wake interval mantissa 817, and/or R-TWT traffic information 818. In some embodiments, the field of R-TWT traffic information 818 may include the subfields of traffic information control 861, R-TWT downlink (DL) TID bitmap 862, and/or R-TWT uplink (UL) TID bitmap 863.

In some embodiments, a TID may be specified in the subfield of R-TWT DL TID bitmap 862 or R-TWT UL TID bitmap 863, depending on a value indicated in the traffic information control subfield 861. Each of the subfields of R-TWT DL TID bitmap 862 and R-TWT UL TID bitmap 863 may have a size of 8 bits (1 octet). In some embodiments, each bit of the DL/UL TID bitmap subfield may indicate a corresponding one of 8 TIDs belonging to AC_BK (background), AC_BE (best effort), AC_VI (video), and AC_VO (voice). An example of encoding of the DL/UL TID bitmap subfield is shown in Table 1.

TABLE 1

| Example Encoding of DL/UL TID bit map subfield | |
|---|---|
| Bit Index of DL/UL TID bitmap subfield | Corresponding TID |
| 0 | 0 (AC_BE) |
| 1 | 1 (AC_BK) |
| 2 | 2 (AC_BK) |
| 3 | 3 (AC_BE) |
| 4 | 4 (AC_VI) |
| 5 | 5 (AC_VI) |
| 6 | 6 (AC_VO) |
| 7 | 7 (AC_VO) |

Referring to FIG. 7 and FIG. 8, a device (e.g., EHT AP or non-AP EHT STA) may (e.g., optionally) provide QoS parameters for R-TWT TIDs (e.g., TIDs indicated in R-TWT DL TID bitmap 862 or TIDs indicated in R-TWT UL TID bitmap 863) as part of an R-TWT setup, by including one or more QoS characteristics elements (e.g., QoS IE [1] 715-1 to QoS IE [N] 715-N) in an action field of an R-TWT setup frame (e.g., TWT setup frame 700). For example, a STA can indicate QoS characteristics for UL traffic associated with a TID by specifying one or more sets of QoS parameters in the QoS IEs 715-1, . . . , 715-N and specifying the corresponding TIDs in the R-TWT UL TID bitmap 863 of the TWT IE 714-1. For example, a STA can indicate (1) first QoS characteristics for UL traffic associated with a first TID and (2) second QoS characteristics for DL traffic associated with a second TID by specifying a first set of QoS parameters in the QoS IE [1] 715-1, specifying a second set of QoS parameters in the QoS IE [2] 715-2, specifying the first TID in the rTWT UL TID bitmap 863 of the TWT IE 714-1, and specifying the second TID in the R-TWT DL TID bitmap 862 of the TWT IE 714-2. In some embodiments, the R-TWT setup frame 700 may be an R-TWT setup request frame or an R-TWT setup response frame. In some embodiments, a device may deliver or provide QoS parameters for R-TWT by (e.g., optionally) using a QoS characteristics element (e.g., QoS IE[1] 715-1 to QoS IE[N] 715-N) in R-TWT negotiations (e.g., exchanging one or more R-TWT setup request frames and/or one or more R-TWT setup response frames), thereby providing QoS parameters for traffic that belongs to or is associated with an R-TWT schedule (e.g., traffic with latency sensitive traffic identifiers (TIDs)).

In some embodiments, a device (e.g., EHT AP or non-AP EHT STA) may be able to (e.g., optionally) provide QoS parameters for R-TWT TIDs along with an R-TWT setup (e.g., while the R-TWT setup is being negotiated) without performing a prior SCS negotiation (e.g., SCS negotiation by exchanging SCS request/response frames including SCS descriptor element 600). In some embodiments, the device may specify QoS parameters for an R-TWT TID such that the QoS parameters for the R-TWT TID may not rely on R-TWT feature dependency on SCS (e.g., the QoS parameters may not be associated with SCSIDs but are associated with one or more TIDs). QoS parameters for (or associated with) one or more R-TWT TID may enable a faster setup for R-TWT TIDs with QoS parameters (e.g., one step for providing QoS parameters for one or more R-TWT TIDs during an R-TWT setup), compared with QoS parameters for SCSIDs which may be potentially setup by two or multiple steps (e.g., one or more SCS negotiations and then an R-TWT setup).

In some embodiments, an action field format of a TWT setup frame (e.g., TWT setup frame action field format 700) may be extended to (e.g., optionally) include one or more QoS characteristics elements (e.g., QoS IE [1] 715-1 to QoS IE [N] 715-N), which can be optionally present in an R-TWT setup frame (e.g., R-TWT setup frame 700) to provide QoS parameters for the traffic indicated by uplink (UL) TIDs (e.g., R-TWT UL TID bitmap 863) and/or downlink (DL) TIDs (e.g., R-TWT DL TID bitmap 862) negotiated in the R-TWT setup. Accordingly, the QoS characteristics elements may be re-used for an R-TWT schedule (e.g., multiple, periodic SPs of the R-TWT schedule). For example, a set of QoS parameters indicated in one or more QoS IEs can be reused for a first SP (e.g., SP duration 404 in FIG. 4) and a second SP (e.g., SP duration 414) of the same R-TWT schedule. Instead of containing one or more QoS characteristics elements (e.g., one or more QoS IEs 618) in SCS request/response frames (e.g., frames including SCS descriptor element 600), a TWT setup frame (e.g., R-TWT setup frame 700) may contain one or more QoS characteristics elements (e.g., QoS IE [1] 715-1 to QoS IE [N] 715-N) associated with one or more TIDs (e.g., TIDs indicated in R-TWT UL TID bitmap 863 or R-TWT DL TID bitmap 862). In some embodiments, there may be multiple QoS characteristics elements because as part of an R-TWT setup, there may be negotiation for UL/DL TIDs. In some embodiments, there may be one QoS characteristics element for each TID. For example, there can be N sets of QoS parameters indicated in QoS IE [1] 715-1 to QoS IE [N] 715-N, corresponding to N number of TIDs indicated in DL/UL TID bitmap 862 or 853 of TWT IE 714-1 and/or TWT IE 714-2. In some embodiments, there may be one QoS characteristics element for two or more of the TIDs (e.g., the same set of QoS parameter indicated in two or more QoS IEs corresponding to two or more TWT IEs). In some embodiments, there may be one QoS characteristics element even when there are no TIDs indicated. This case can arise when one or more QoS characteristics element(s) are delivered for a P2P link where TID is not relevant and may not be indicated. TIDs for a P2P link may not be indicated during R-TWT setup.

Figure 9:
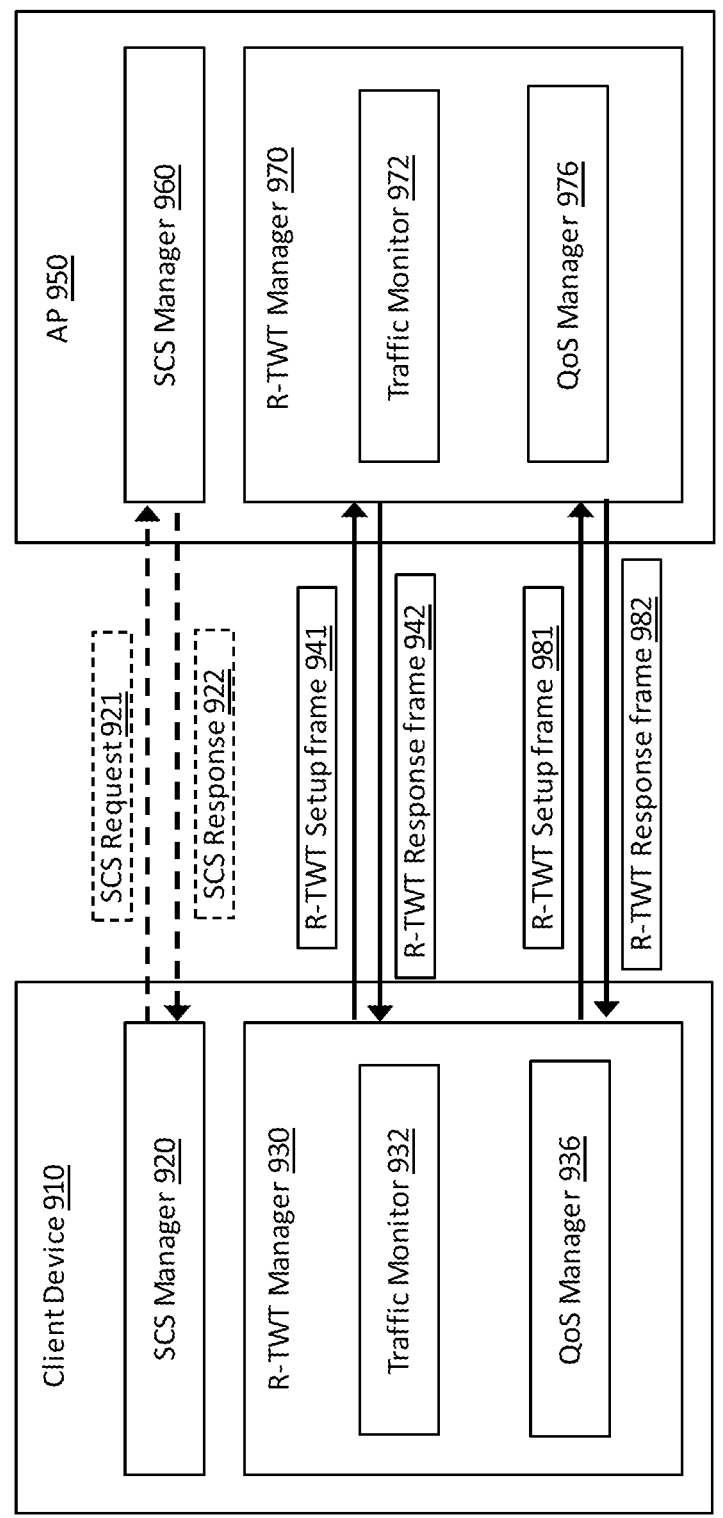
FIG. 9 is a block diagram of a system environment in which a client device and an AP communicate data relating to QoS parameters, according to an example implementation of the present disclosure.

FIG. 9 is a block diagram of a system environment 900 in which a client device 910 and an AP 950 communicate data relating to QoS parameters, according to an example implementation of the present disclosure. In some embodiments, the client device 910 may be a non-AP STA, a HWD, or a computing device. The device 910 may include an SCS manager 920 configured to perform SCS negotiations with other device (e.g., AP 950) to provide QoS parameters relating to particular SCS streams. In some embodiments, the SCS manager 920 may exchange SCS requests (e.g., SCS request 921) and/or SCS responses (e.g., SCS response 922) with the other device. The device 910 may include an R-TWT manager 930 configured to set up R-TWT schedules with other device (e.g., AP 950) to provide QoS parameters relating to traffic streams with particular TIDs. In some embodiments, the R-TWT manager 930 may exchange R-TWT setup frames (e.g., R-TWT setup request frames 941, 981) and/or R-TWT response frames (e.g., R-TWT setup response frames 942, 982) with the other device. In some embodiments, the R-TWT manager 930 may include a traffic monitor 932 configured to determine a change in traffic pattern of traffic streams associated with a particular TID, and a QoS manager 936 configured to determine and/or use QoS parameters for sending/receiving traffic streams with particular TIDs. Each of the SCS manager 920 and the R-TWT manager 930 includes an electronic component or a combination of an electronic component and a software component.

In some embodiments, the AP 950 may be an AP, a soft AP or a computing device in a WLAN. The AP 950 may include an SCS manager 960 configured to perform SCS negotiations with other device (e.g., client device 910) to provide QoS parameters relating to particular SCS streams. In some embodiments, the SCS manager 960 may exchange SCS requests (e.g., SCS request 921) and/or SCS responses (e.g., SCS response 922) with the other device. The AP 950 may include an R-TWT manager 970 configured to set up R-TWT schedules with other device (e.g., client device 910) to provide QoS parameters relating to traffic streams with particular TIDs. In some embodiments, the R-TWT manager 970 may exchange R-TWT setup frames (e.g., R-TWT setup request frames 941, 981) and/or R-TWT response frames (e.g., R-TWT setup response frames 942, 982) with the other device. In some embodiments, the R-TWT manager 970 may include a traffic monitor 972 configured to determine a change in traffic pattern of traffic streams associated with a particular TID, and a QoS manager 976 configured to determine and/or use QoS parameters for sending/receiving traffic streams with particular TIDs. Each of the SCS manager 960 and the R-TWT manager 970 includes an electronic component or a combination of an electronic component and a software component.

Referring to FIG. 9, a device (e.g., client device 910 or AP 950) may detect, via a traffic monitor (e.g., traffic monitor 932 or 972) a change in traffic pattern, such as burst, size, delay, etc. The traffic monitor may monitor behaviors of an application running on the device or monitor wireless traffic by setting a wireless network interface in a monitoring mode. In response to detecting a change in traffic pattern, the device may send a TWT setup frame (e.g., TWT setup request frame 981) again to determine or set up QoS parameters for one or more TID changes for an R-TWT SP. In some embodiments, in response to detecting a change in traffic pattern associated with a particular TID, the device may send a TWT setup frame (e.g., TWT setup request frame 981) again to change QoS parameters associated with the particular TID. In some embodiments, the device (e.g., non-AP STA) may dynamically send a TWT setup frame to another device (e.g., AP) based on at least one of detected changes in traffic pattern (which may be detected via traffic monitor 932, 972), channel condition (which may be detected by wireless monitoring), or a configured schedule/periodic-cycle, to specify changed/revised/updated QoS characteristics elements for the same R-TWT SP and/or renegotiate the R-TWT SP.

In some embodiments, an AP (e.g., AP 950) and a STA (e.g., client device 510) can still create and provide QoS characteristics for specific SCS streams, while providing QoS parameters for one or more R-TWT TIDs. One or more SCS streams can be created optionally. For example, one or more SCS streams and corresponding QoS parameters can be created/setup by exchanging an SCS request 921 and an SCS response 922, which may include SCS descriptor element 600. If an SCS stream is created before an R-TWT setup (e.g., R-TWT setup by R-TWT setup request frame 941 and R-TWT setup response frame 942), then QoS parameters from (or set up for) the SCS stream may also apply to traffic matching the SCS stream in an R-TWT schedule (e.g., during a service period of the R-TWT schedule). For any other traffic associated with an R-TWT TID, QoS parameters provided in the R-TWT setup (e.g., R-TWT setup by R-TWT setup request frame 941 and R-TWT setup response frame 942) for the R-TWT TID may apply.

In some embodiments, R-TWT features may be able to support a wide range of devices with different application requirements and power/resource constraints. Supporting QoS parameters as part of an R-TWT setup may enable usage of R-TWT by wide range of devices. For example, a device with a small form factor (e.g., handheld small form factor-based devices, or smartphone) may setup R-TWT SPs by including a QoS characteristics element in an R-TWT setup frame (e.g., R-TWT setup request frame 941 or R-TWT setup response frame 942). The device may optionally perform an SCS negotiation (e.g., exchanging SCS request 921 and SCS response 922) which may be used for setting up a traffic filter and to specify traffic characteristics for specific streams. In this manner, the device may specify QoS parameters for multiple traffic streams in different levels of granularity using SCS and R-TWT.

Figure 10:
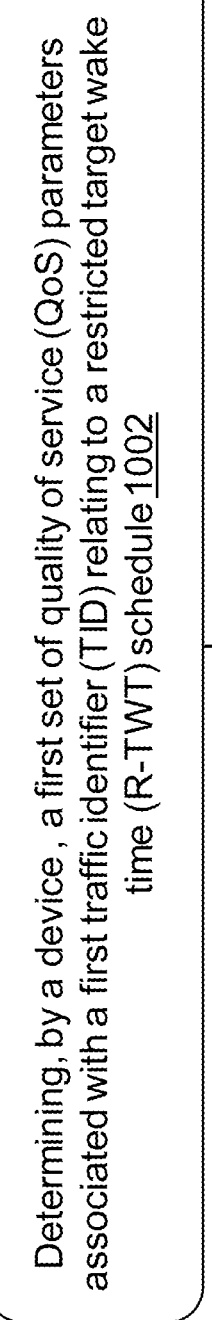
FIG. 10 is a flowchart showing a process of providing QoS parameters for restricted TWT (R-TWT) operations, according to an example implementation of the present disclosure.

FIG. 10 is a flowchart showing a process 1000 of providing QoS parameters for R-TWT operations, according to an example implementation of the present disclosure. In some embodiments, the process 1000 is performed by a device (e.g., a computing device 110A, 110B, a HWD 150A, 150B, an AP 105, 950, a non-AP STA or client device 910). In some embodiments, the process 1000 is performed by other entities. In some embodiments, the process 1000 includes more, fewer, or different steps than shown in FIG. 10.

In one approach, the device may determine 1002 a first set of QoS parameters (e.g., QoS parameters indicated in QoS IE 715-1) associated with a first TID (e.g., first TID indicated in R-TWT DL TID bitmap 862 or R-TWT UL TID bitmap 863 of TWT IE 714-1 or TWT IE 714-2) relating to a R-TWT schedule in a WLAN.

In one approach, the device may wirelessly transmit 1004, via a transceiver (e.g., network interface 320), a first frame (e.g., TWT setup frame 700) including the first set of QoS parameters. In some embodiments, the device may transmit or receive, via the transceiver, one or more frames associated with the first TID using the first set of QoS parameters during a first service period (SP) of the R-TWT schedule (e.g., first SP duration 404 of an R-TWT schedule). The device may transmit or receive, via the transceiver, one or more frames associated with the first TID using the first set of QoS parameters during a second SP of the R-TWT schedule (e.g., second SP duration 414 of the same R-TWT schedule) that is different from the first SP.

In some embodiments, the first frame may be an R-TWT setup frame (e.g., R-TWT setup request/response frame 700) including one or more IEs (e.g., TWT IE 714-1 or 714-2). The one or more IEs of the R-TWT setup frame may include the first set of QoS parameters and the first TID. The one or more information elements may include one or more traffic specification (TSPEC) elements (e.g., one or more QoS IEs 500).

In some embodiments, the one or more IEs of the R-TWT setup frame may further include a second TID (e.g., second TID indicated in R-TWT DL TID bitmap 862 or R-TWT UL TID bitmap 863 of TWT IE 714-1 or TWT IE 714-2) and a second set of QoS parameters (e.g., QoS parameters indicated in QoS IE 715-2) associated with the second TID. The device may transmit or receive one or more frames associated with the second TID using the second set of QoS parameters during one or more service periods (SPs) of the R-TWT schedule. For example, during the SPs 404, 414 of the R-TWT schedules, the first set of QoS parameters may be used to transmit or receive traffic associated with the first TID and the second set of QoS parameters may be used to transmit or receive traffic associated with the second TID. In some embodiments, the first set of QoS parameters may be the same as the second set of QoS parameters.

In some embodiments, the device may determine, after transmitting the first frame, a third set of QoS parameters associated with the first TID (e.g., the first TID indicated in R-TWT DL TID bitmap 862 or R-TWT UL TID bitmap 863 of TWT IE 714-1 or TWT IE 714-2) relating to the R-TWT schedule. The device may wirelessly transmit, via the transceiver, another frame including the third set of QoS parameters (e.g., replacing the first set of QoS with the third set of QoS in QoS IE 715-1). After transmitting the second frame, the device may transmit or receive, via the transceiver, one or more frames associated with the first TID using the third set of QoS parameters during one or more SPs of the R-TWT schedule. For example, during the SPs 404, 414 of the R-TWT schedules, the third set of QoS parameters may be used to transmit or receive traffic associated with the first TID. In some embodiments, the device (e.g., traffic monitor 932 or 972) may determine a change in traffic pattern associated with the first TID. Responsive to determining the traffic pattern change, the device may determine the third set of QoS parameters associated with the first TID relating to the R-TWT schedule. For example, referring to FIG. 9, a device (e.g., client device 910 or AP 950) may detect, via a traffic monitor (e.g., traffic monitor 932 or 972) a change in traffic pattern, such as burst, size, delay, etc. In response to detecting a change in traffic pattern, the device may send a TWT setup frame (e.g., TWT setup request frame 981) again to determine or set up QoS parameters for one or more TID changes for an R-TWT SP.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

30

What is claimed is:

1. A device comprising:
one or more processors configured to:
determine, without performing a stream classification service (SCS) negotiation, a first set of quality of service (QOS) parameters associated with a first traffic identifier (TID) relating to a restricted target wake time (R-TWT) schedule in a wireless local area network (WLAN);
wirelessly transmit, via a transceiver, a first frame including the first set of QoS parameters;
determine, after transmitting the first frame, without performing an SCS negotiation, a third set of QoS parameters associated with the first TID relating to the R-TWT schedule; and
wirelessly transmit, via the transceiver, a second frame including the third set of QoS parameters.

2. The device of claim 1, wherein the one or more processors are configured to transmit or receive, via the transceiver, one or more frames associated with the first TID using the first set of QOS parameters during a first service period (SP) of the R-TWT schedule.

3. The device of claim 2, wherein the one or more processors are configured to transmit or receive, via the transceiver, one or more frames associated with the first TID using the first set of QOS parameters during a second SP of the R-TWT schedule that is different from the first SP.

4. The device of claim 1, wherein:
the first frame is an R-TWT setup frame including one or more information elements IEs), and
the one or more IEs of the R-TWT setup frame include the first set of QOS parameters and the first TID.

5. The device of claim 4, wherein the one or more information elements include one or more traffic specification (TSPEC) elements.

6. The device of claim 4, wherein:
the one or more IEs of the R-TWT setup frame further include a second TID and a second set of QoS parameters associated with the second TID, and
the one or more processors are configured to transmit or receive one or more frames associated with the second TID using the second set of QOS parameters during one or more service periods (SPs) of the R-TWT schedule.

7. The device of claim 6, wherein the first set of QOS parameters are same as the second set of QOS parameters.

8. The device of claim 1, wherein after transmitting the second frame, the one or more processors are configured to transmit or receive, via the transceiver, one or more frames associated with the first TID using the third set of QoS parameters during one or more SPs of the R-TWT schedule.

9. The device of claim 1, wherein the one or more processors configured to:
determine a change in traffic pattern associated with the first TID; and
responsive to determining the traffic pattern change, determine the third set of QoS parameters associated with the first TID relating to the R-TWT schedule.

10. A method comprising:
determining, by a device without performing a stream classification service (SCS) negotiation, a first set of quality of service (QOS) parameters associated with a first traffic identifier (TID) relating to a restricted target wake time (R-TWT) schedule in a wireless local area network (WLAN);
wirelessly transmitting, via a transceiver, a first frame including the first set of QoS parameters;

determining, after transmitting the first frame, without performing an SCS negotiation, a third set of QoS parameters associated with the first TID relating to the R-TWT schedule; and wirelessly transmitting, via the transceiver, a second frame including the third set of QoS parameters.

11. The method of claim 10, further comprising:

transmitting or receiving, via the transceiver, one or more frames associated with the first TID using the first set of QoS parameters during a first service period (SP) of the R-TWT schedule.

12. The method of claim 11, further comprising:

transmitting or receiving, via the transceiver, one or more frames associated with the first TID using the first set of QOS parameters during a second SP of the R-TWT schedule that is different from the first SP.

13. The method of claim 10, wherein:

the first frame is an R-TWT setup frame including one or more information elements (IEs), and the one or more IEs of the R-TWT setup frame include the first set of QOS parameters and the first TID.

14. The method of claim 13, wherein the one or more information elements include one or more traffic specification (TSPEC) elements.

15. The method of claim 13, wherein:

the one or more IEs of the R-TWT setup frame further include a second TID and a second set of QOS parameters associated with the second TID, and the method further comprises transmitting or receiving one or more frames associated with the second TID using the second set of QoS parameters during one or more service periods SPs) of the R-TWT schedule.

16. The method of claim 15, wherein the first set of QOS parameters are same as the second set of QoS parameters.

17. The method of claim 10, further comprising:

after transmitting the second frame, transmitting or receiving, via the transceiver, one or more frames associated with the first TID using the third set of QoS parameters during one or more SPs of the R-TWT schedule.

18. The method of claim 10, further comprising:

determining a change in traffic pattern associated with the first TID; and responsive to determining the traffic pattern change, determining the third set of QoS parameters associated with the first TID relating to the R-TWT schedule.

* * * * *